Aug. 21, 1945.　　　A. W. MILLER　　　2,383,010
DETACHABLE COUPLING
Filed Aug. 25, 1943　　　2 Sheets-Sheet 2
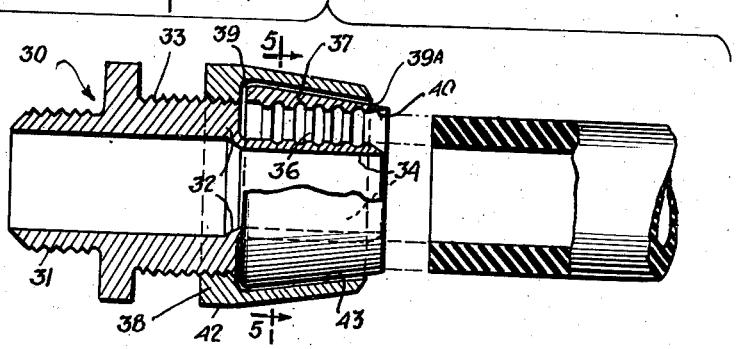
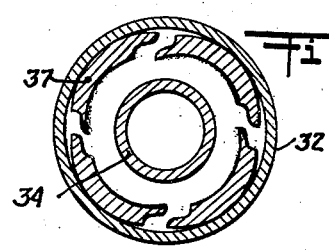
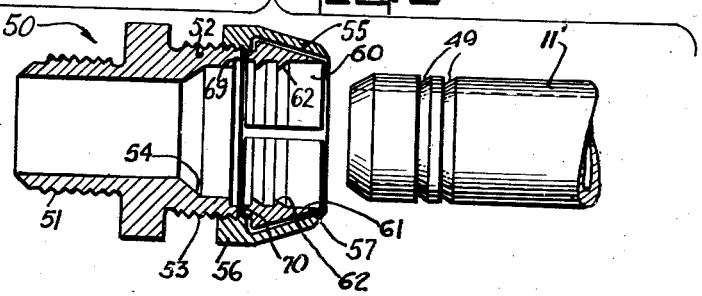
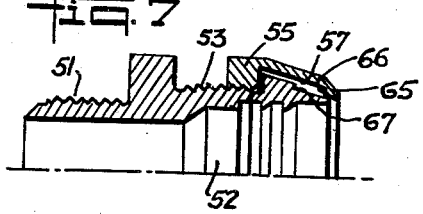
INVENTOR.
Albert W. Miller
BY
Howard J. Jeandron
ATTORNEY Patented Aug. 21, 1945

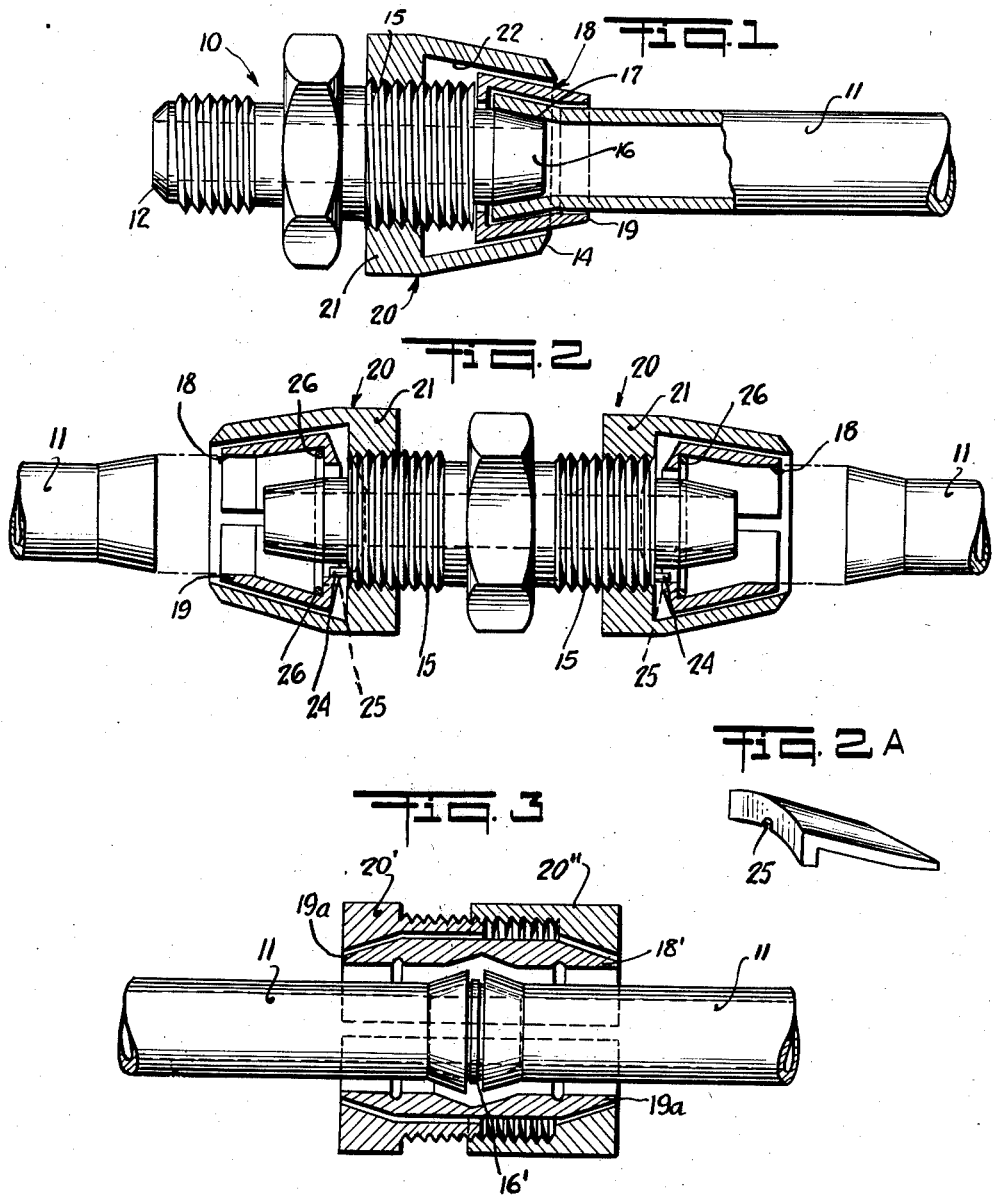

2,383,010

UNITED STATES PATENT OFFICE 2,383,010

DETACHABLE COUPLING

Albert W. Miller, Jamaica, N. Y.

Application August 25, 1943, Serial No. 499,928

14 Claims. (Cl. 285—86)

REISSUED NOV 5 1946

This invention relates to detachable couplings for tube or pipe and, more particularly, to a coupling which may be applied to the tube or pipe without preliminary fitting of the tube or pipe, also in particular, a coupling in which the predetermined gripping action is diffused behind the flare on the tube.

Heretofore, detachable couplings have required the placing of part of the coupling over the end of the tube before flaring the tube, in order that the gripping part could be brought up against the flared section, this places the holding force at the flared section and often causes the crystallizing of the metal when metal is used, or the tearing or damaging of the structure at this point, in cases where plastics or other soft material is used. Another weakness in this type of coupling has been noticed where there is vibration, which sets up a whipping action and accelerates the crystallization or tearing or pulling out of the tubing. To overcome this condition there have been various attempts, such as elongating the neck of a sleeve which is placed over the tube to lessen the whipping action at a critical section and somewhat diffuse it or move the point of whip back from the flared end.

With the foregoing in view, it is an object of the present invention to provide a detachable coupling which may be applied to a preformed flared tube, without pre-setting any part of the coupling on the tube.

Another object of the present invention is to provide an easily applied coupling for tubing, in which a desired amount of the gripping force of the coupling is diffused behind the flare in the tubing.

A further object of the present invention is to provide a coupling in which the elements provide a predetermined amount of clamping or gripping pressure on the desired area of the tube or pipe.

A further object of the present invention is to provide a detachable coupling in which the gripping force exerted on the exterior of the tubing is supported partially by the coupling on the interior of the tubing.

A still further object of the present invention is to provide a detachable coupling in which the gripping member of the coupling provides resultant forces acting parallel with the axis of the coupling and the tubing.

Another object of the invention is to provide a coupling of the character described which shall be simple and rugged in construction, easily applicable in use, and which shall enable quick attachment yet positive gripping in application.

Other objects and characteristic features of the invention will appear from the following detailed description taken in conjunction with the accompanying drawings wherein identical reference numerals are applied to identical parts in the several figures and in which Fig. 1 shows a cross section of one of the forms of a coupling in a closed position, with the tube in place and clamped;

Fig. 2 shows a cross section of the same form of coupling in the open position ready to receive the end of a flared tube, except that both ends are similar tube holding types, as illustrated in Fig. 1;

Fig. 2A is a prspective of one of the collar segments;

Fig. 3 shows a cross section in an open position of a similar coupling for two pieces of flared tubing with a slight modification in structure;

Fig. 4 shows another embodiment of the coupling with a rubber or plastic hose;

Fig. 5 shows a cross sectional view of the coupling taken on the line 5—5 of Fig. 4;

Fig. 6 shows a still further embodiment of the coupling in cross section, which may be applied to either metal or plastic tubing; and Fig. 7 shows a further modification of the coupling illustrated in Fig. 6.

In accordance with the objects, one embodiment of this invention consists of a coupling 10 according to Fig. 1, in which a preformed flared tube 11 has been inserted and clamped. This coupling is provided with one end 12 for attaching to a standard fitting and the other end 14 to hold the flared tube 11. The end 14 of this coupling is comprised of an exteriorly screw-threaded boss 15 with a conically formed extended tube end fitting 16 on which the flared end 17 of the tube 11 is fitted. A longitudinally split collar 18 composed of two or more parts is applied to the outside of the flared tube 11. The inside portions of the collar 18 are shaped to conform with the periphery of the flare 17, including an extension 19 which lies parallel with the neck of the tube and which is formed to a desired length. The opposite end of segments 18 has a sharp angular portion bent inwardly beyond the end of the flared tube 11 and positioned to abut against the shoulder of the threaded portion 15 to regulate and limit the forward longitudinal movement of the segments. A nut or fastening member 20 is threadably secured to the externally threaded extension 15 and is comprised of a main body portion 21 and a hollow portion 22 having its largest inside diameter near the center of the nut and its smallest inside diameter at the outer end so that the inner circumference of the hollow portion conforms to the outer taper of the collar segments. Thus, it is apparent that when the coupling is in an open position as shown in Fig. 2, the flared tube may be inserted into the end of the coupling through the spread insert collar 18 and the flared end of the tube pressed up against the conically formed tube end fitting 16. Threading the nut 20 forward on to the thread 15 causes its tapered walls 22 to press the portions 18 against the flared end 17 and the adjacent neck of the tube 11. As the nut is tightened, the pressure or clamping force increases until the inner surface of collar 18 and the end 19 establish a positive hold on the periphery of the flared section and the adjacent neck of the tube. The segments of the collar being selectively preformed with a predetermined arc for a particular circle at which their edges abut to limit their contraction to prevent a pressure being applied that would crush or damage a tube of a particular composition.

The term "boss" as used herein is to be understood as referring to an extension or sleeve on one coupling member, and it is threaded to receive the threaded opening of the other coupling member.

It is to be noted that the inner circumference of the collar 18 is designed to correspond to a definite degree of flare on the tube 11 and that the grip on the neck of the tube adjacent to the flare may be lengthened as desired; for example, if a tube is given a flare of 10 degrees 37 minutes and the base length of the flare is 1/4 of an inch, the spread or rise at the outer end will be 3/64 of an inch. Therefore, if a segment of the collar be used with a wall thickness that corresponds to the rise of the flare of the tube (3/64 of an inch), the longitudinal base length of the outer circumference of the segment sections will be 1/2 inch and it will, therefore, overlap on the neck of the tube 1/4 of an inch. The longitudinal base length of the angle of the inner circumference of the segments would be 1/4 of an inch and the extension which lies parallel to the tube would likewise be 1/4 of an inch. It also holds true that should it be desired to increase the length of that portion of the segments which lies parallel to the neck of the tube, this may be accomplished by increasing the thickness of the segment wall, for example: a segment of 1/16 of an inch in thickness would provide an overlap on the neck of the tube of .333 of an inch. Likewise, the length of the grip on the neck of the tube adjacent to the flare may be increased any desired amount by providing an extension of the segment sections, the outer circumference of which will lie in a parallel relationship with the tube. The manner of gripping the tube about its neck with the segments is very important as it relieves the flared portion of most of the tensile, torsional and vibrational stresses. It is to be noted that normally the segments of the split collar 18 will bite into the flared end of the tube and will not turn with nut 20 as it is applied. To insure the segments remaining in a fixed position and prevent them turning with the nut 20, one or more pins 24 may be inserted in the section 15 and a notch 25 may be formed in the inner periphery of the angular portion of each segment of the split collar 18. Thus, when the nut is turned a segment, due to the notch 25 engaging with the pin 24, will be held in place and will likewise hold all other segments in the same fixed relationship. Other means (not shown) may be employed to hold the segments in a fixed position with relation to the flared end of the tube.

In Fig. 2 I have illustrated the same type coupling except that it is formed with both ends for holding the flared end of a tube; also, I have shown the coupling in an open position to illustrate the easy access that a flared tube end will have when being inserted into the coupling. The coupling in its open position illustrates the collar 18 as expanded to a larger inner diameter than in Fig. 1; this may be accomplished in various ways, possibly using a single spring wire insert which may be placed in back of the angular portion but not to interfere with the end of the flared tube, as illustrated at 26 in Fig. 2. With such an arrangement, the collar will be expanded as the nut pressure is released and will always rest against the inner circumference of the inner tapered surface of the nut 20. The segments in their open position do not offer any obstruction to the flared end of the tube 11 when it is inserted, as their least inner diameter is as great or more than the diameter of the outer end of the flared portion of tube 11. The spring wire insert is merely illustrative of a resilient means to hold the segments in an open position, as various other methods or means might be employed.

Referring to Fig. 3, note that the coupling has been modified to hold both flared ends of tubes 11 in close proximity to each other and the section 16 of the coupling described in Figs. 1 and 2 has become a separate double-ended tube end fitting 16' which conforms on both ends to the angle of the flared tube with which it is to be mated. Likewise, the split collar 18' has been reshaped to double its original length and its inner central section formed to conform to the periphery of both flared ends of tubes 11 when they are mated with the insert 16'. The segments of the collar 18' are formed with two angular ends 19a which may or may not conform to the angle of the flanges of the tubes 11, but must conform to the inner face of two outer nut members 20' and 20". The nut members 20' and 20" are formed as male and female threaded unions so that when threaded together, they draw each other closer to a central point of union. When members 20' and 20" are threaded together, their inner surfaces will rise on the angular surfaces of the ends of the segments of the collar 18' because of contracting the said collar and thus establish a clamping action on the tubes. When the nuts 20' and 20" have been drawn up tightly, they will have positioned the segments in a tight relationship with each other as well as holding or clamping the two flared ends of tubes 11 in the inner central section of the split collar 18' as illustrated in the Figure 3. It is apparent that tubes 11 will be held tightly in this position and that a considerable length of gripping hold on the tubes adjacent to their flared ends is obtained. The angle of flare provided in tubes 11 is governed primarily by the torsional strain and the material used in the tubing as the design illustrated in Figure 3 will have the same gripping force on tubes 11 for various angles of flare in the tubes.

In the embodiments of the couplings illustrated in Figures 1, 2 and 3, the inner periphery of the portions 19 and 19a of the collar segments which lie generally parallel to the neck of the tubes adjacent to their flared ends, are formed on their inner surface with a slight taper of a desired length from a larger diameter at their outer ends to a least diameter at a point removed therefrom. This slight taper of about 1 degree is provided to afford a vibration diffusing or absorbing means to prevent crystallization and fracture of the tubes at the point of contact with the coupling. Such vibrations are diffused over a zone of gradually increasing pressure on the tubes. This is an especially important feature for installations where severe and sustained vibrations are present. The inner periphery of the segments may be slightly roughened in texture to provide a better grip or clasping of the tube.

Figures 1, 2 and 3 illustrate couplings for holding tubes with flared ends having long, small angles of about 10 degrees. As far as holding the tubes is concerned it is unnecessary to flare the tubes because of the powerful gripping force inherent in these constructions. The flares as illustrated in these figures of the drawings are desirable for installations carrying fluids under high pressure, but for installations carrying fluids under low pressure, tubes may be used without flaring if a slight modification is made in the illustrated shape of the collar segments to provide an inner longitudinal face that lies parallel with the periphery of an unflared tube as illustrated at 37 in Figure 4, and in place of the conical portions 16, provide a bore to receive the end of the tube. When fluid is present a gasket should be inserted in a recess provided in the inner periphery of the collar segments 18 and 18' or in the inner end of the bore in the face of the boss 15, to prevent leakage. For other installations, such as tubes being used for cable conduits, such gaskets are not necessary. For services where it is desired to use light weight tubes with thin walls, a tube insert may be used to support the clamped ends of the tubes.

Another embodiment is illustrated in Figure 4 in which a coupling 30 is provided with a threaded end 31 for attaching to a standard fitting and the other end 32 is designed to grip a tube, rubber hose, plastic tube, or tube of similar characteristics. The end 32 comprises an exteriorly screwthreaded boss 33 and an extended nipple 34, forming the main body of the coupling. The nipple 34 is formed with a smooth internal bore to present the least amount of frictional resistance to the flow of fluid therethrough, whereas the external portion may be comprised of serrations which provide a gripping area on the internal face of the tube in which it is inserted. The coupling also comprises a longitudinally split collar 36 made up of a plurality of segments 37 and an outer nut member 38 which is threaded on the boss 33 of the main portion of the coupling. The segments 37 may be formed with an inner serrated face which lies parallel to and is similar in structure to the outer face of the nipple 34, whereas the outer face of the segments are formed smooth with a slope of approximately 5 to 15 degrees as required, depending upon the character of the tubing to be gripped and, therefore, the maximum amount of pressure that is required. The slope extends from a greater diameter at the inner end 39 to a lesser diameter at its outer end 39A. The outer nut member 38 is comprised of a main body portion 42 and a hollow portion 43 having its largest diameter near the center of the nut and the least diameter at the outer end. The slope of the internal face conforms to the slope of the split collar 36, usually within the range of 5 to 15 degrees.

The wall of the nipple 34 is comparatively light but sufficient to withstand the maximum predetermined pressure which may be created by the nut 38 when it is drawn up tightly on the threaded boss 33 of the coupling. The end of the nipple 34 is formed with a slight taper from a least diameter at its outer end to the high point of the serrations. This assists the nipple when being forced into the mouth of a tube, as it permits the tube to be slightly expanded and, thereafter, fit snugly over the exterior serrated face of the nipple.

Likewise the end 39A of the collar 36 has a tapered portion 40 which is tapered in the opposite direction so that the collar will slide over the outer diameter of the tube as the tube is inserted therein. The two tapered faces, the end of the collar and the end of the nipple, form a V-shape, and, therefore, under pressure will give a progressively increasing pressure from the outer edge of contact to the inner face of the gripping area.

When a tube is to be connected to the coupling, nut 38 is backed off to the outer end of the threaded boss 33 to the position shown in Fig. 4. The tube may now be forced over the nipple 34 until its end abuts the main section 32 of the coupling. The nut is then screwed forward on the threaded boss 33 and as this occurs the portion 43 of the nut will bear with increasing force upon the outer face of the split collar 36 gradually forcing its inner serrated face into the external surface of the tube. The gripping pressure on the tubing will be dissipated or diffused into a squeezing pressure, as the pressure of the collar 36 will also cause the tubing to be pressed into the external serrated face of the nipple 34. In a tube or pipe having a known degree of hardness, the amount of such compression or displacement required is provided for by the degree of compressive slope which is the angle of the cooperating surfaces of the collar and the nut, for example: if the angle be 14 degrees then the hose or tube wall thickness would be subjected to a net displacement of about .048 of an inch when the nut is advanced about ¼ of an inch on thread 33, or in the event the angle was about 7 degrees and the nut were advanced about ½ of an inch the compression on the tube would be about the same. There is always a fixed relationship between the slope of the clamping faces and the clamping nut thread movement.

In Fig. 4 I have illustrated a series of serrations on the exterior face of the nipple 34 and on the inner face of the segments of the collar 36, it is to be noted that the serrations are arranged in a parallel relationship when they are to be used with a rubber hose as this permits the high points of the serrations to bear on the hose at the same point from opposite sides and thus displace or extrude the rubber into the lower part of the serrations giving a tight gripping relationship. When the coupling is to be used for plastic tubing it is desirable to place the serrations in a staggered relationship as the pressure on the tubing displaces the plastic into a rippled or corrugated formation and the plastic retains that set even after removing the coupling. As in the case of the couplings previously described, the segments 36 are likewise selectively preformed with a predetermined arc for a particular circle at which their edges abut to limit their contraction to prevent a pressure being applied that would crush or damage a tube of a particular composition. The arcs are, of course, predetermined in radius or diameter as required for use when fastening tubes of different characteristics due to the permissible compression allowable on the various compositions used, such as the various types of rubber tubes and tubes made of plastic materials.

A still further embodiment is illustrated in Figures 6 and 7 in which a coupling 50 is provided with a threaded end 51 for attaching to a standard fitting and the other end 52 is designed to receive tube 11'. The tube may have one or more key slots 49 cut with a right angle face toward the coupling and a 45 degree face away from the coupling. The key shots are formed around the periphery of the tube 11'. The end 52 of the coupling is comprised of an exteriorly threaded boss 53 and an internal bore 54 shaped at its inner end to receive the end of the tube 11'. A nut 55 is threadably secured to the boss 53 and is comprised of a main body portion 56 and a hollow portion 57 having its largest diameter near the center of the nut and its smallest diameter at the outer end so that the inner circumference of the hollow portion has a taper which is usually between 5 degrees and 15 degrees.

A split collar 60 is mounted within the nut 55 and is comprised of a plurality of segments 61. The exterior of each section is tapered to conform to the inner circumference of the hollow portion 57 of the nut 55, whereas the internal face of each section 61 is formed parallel to the tube to be inserted therein. On this internal face of the sections 61 there may be provided one or more raised keys 62 which are spaced in the same relationship as the key slots 49 on the tube 11'. They are also shaped with a right angle face on the inner side and a 45 degree face on the outer side so that they conform to the slots 49 into which they are intended to be inserted, and they are approximately the same size to insure a snug fit.

In Fig. 6, the collar 60 is held in a proper relationship with the tube 11', when in its open position by the abutment of the shoulder 70 of collar 60 and the outer face of the end 52 of the coupling. When the nut 55 is advanced on the thread 53 the collar 60 will be contracted causing the keys 62 to engage with the key slots 49. When the collar has contracted sufficiently it will have an unobstructed longitudinal forward movement and the shoulder 70 will pass into the recess 69 in the face of the coupling. The longitudinal forces provided to the tube by further advancing of the nut 55 will force the end of the tube 11' into a tight leak proof seal with the internal bore 54. It is to be noted that it is not necessary to remove the nut 55 from the thread 53 as an expansion wire or spring may be incorporated in the split collar 60 and when the nut is turned back to the position indicated in Figure 6 the collar 60 will open sufficiently to allow the tube 11' to be removed or inserted as the case may be. Upon threading the nut forward on thread 53 the collar 60 will be brought into a snug engagement with the tube 11' and will force the tube into a tight fitting position with the internal portion of the coupling. It is to be noted that shoulder 70 abuts shoulder 69 when the tube has been forced to a predetermined and limited position in a longitudinal direction.

A slight modification of this embodiment is indicated in Figure 7 in which the nut 55 has formed on the portion 57 a lip 65 having a face 66 at right angles to the axis of the coupling and the collar 60 has two steps in its outer periphery forming a face 67 which is also at right angles to the axis of the coupling. In operation, as the nut 55 is tightened and after it has squeezed the collar 60 snugly against the surface of tube 11' the face 66 of the nut 55 comes into contact with the face 67 of the collar 60, and thereafter exerts a direct longitudinal pressure on the collar, which will force the collar and therefore the tube which is keyed thereto, snugly against the internal face of the coupling to establish a leak proof connection.

In Figure 6 the longitudinal forces on the tube 11' are resultant forces established through the tapered cooperating surfaces of the collar 60 and the nut 55 whereas in Figure 7, although the same forces are present an additional direct longitudinal force is brought to bear on the tube when the two faces 66 and 67 meet as nut 55 is moved forward on thread 53.

All the embodiments of this invention include the use of a plurality of segments of a split collar with tapered surfaces. An important feature of this invention is that these collar segments may be so constructed that when they are squeezed together by being forced into the smaller end of the tapered nut as it is advanced on the cooperating threads, their edges will abut at a predetermined point and thus prevent any increase of pressure on the tube regardless of the amount of turning torque that may thereafter be applied in tightening the clamping nut. Thus the construction permits of determining in advance the maximum amount of pressure that can be applied to the tube when attaching it to the coupling. Such positive control is especially important when it is desired to connect tubing of the softer metal alloys and for tubing made of plastic materials, as such tubing becomes seriously deformed or crushed when subjected to excessive clamping pressure.

The embodiments of the invention herein disclosed are merely illustrative and may be modified and departed from in many ways without departing from the spirit and scope of the invention as pointed out in and limited solely by the appended claims.

What is claimed is:

1. In a detachable tube coupling including an exteriorly screw-threaded boss, a tube end fitting, a collar comprised of a plurality of longitudinal segments that act independently of each other, said segments having exterior tapered surfaces, an interiorly screw-threaded binding nut to engage the threaded boss of the said coupling, said binding nut having an extended portion shaped to conform to the exterior surfaces of said segments, friction means on the interior surfaces of said segments, means to control and limit the longitudinal movement of said segments, the said binding nut contracting the said segments to squeeze said segments into a gripping relation on a tube, said binding nut and said segments operating to force said tube into a firm connection with the said tube end fitting.

2. In a detachable tube coupling comprised of an exteriorly screw-threaded boss, a tube end fitting, a collar comprised of a plurality of longitudinal segments that act independently of each other, said segments having exterior tapered surfaces, an interiorly screw-threaded binding nut to engage the threaded boss of the said coupling, said binding nut having an extended portion shaped to conform to the exterior surfaces of said segments, friction means on the interior surfaces of said segments, means to control and limit the longitudinal movement of said segments, the said binding nut contracting the said segments to squeeze said segments into a gripping relation on a tube, the edges of said segments contacting to limit their contraction, and the resultant gripping pressure, to prevent the crushing of the tube, said binding nut and said segments operating to force said tube into a firm connection with the said tube end fitting.

3. In a detachable tube coupling including an exteriorly screw-threaded boss, a tube end fitting, a collar comprised of a plurality of longitudinal segments that act independently of each other, said segments having exterior tapered surfaces, an interiorly screw-threaded binding nut to engage the threaded boss of the said coupling, said binding nut having an extended portion shaped to conform to the exterior surfaces of said segments, friction means on the interior surfaces of said segments, means to control and limit the longitudinal movement of said segments, the said binding nut contracting the said segments to squeeze said segments into a gripping relation on a tube, means provided to limit their contraction, and the resultant gripping pressure, to prevent the crushing of the tube, said binding nut and said segments operating to force said tube into a firm connection with the said tube end fitting, and a resilient means to expand the said segments to hold their outer tapered surfaces in juxtaposition with the interior tapered surface of the binding nut when said binding nut is retracted, the outer ends of said segments having a slight taper adjacent to the tube to be gripped to provide a gradually increasing pressure on the tube whereby the vibrational stresses are diffused and transferred to the coupling.

4. In a detachable tube coupling including an exteriorly screw-threaded boss, a collar comprised of a plurality of longitudinal segments with predetermined exterior tapers, a binding nut having an interior taper to conform to the exterior taper of the segments, the binding nut having also an internal screw thread to engage the threaded boss of the coupling, the segments co-acting to grip the tube when the binding nut is turned forward on the threads of the boss, said segments having a predetermined set for a particular circle at which their edges abut to limit their contraction, the binding nut contracting the segments upon the tube and thus clamping the tube with a predetermined and limited pressure.

5. In a detachable tube coupling including an exteriorly screw-threaded boss having a shoulder, a collar comprised of a plurality of longitudinal segments that act independently of each other, said segments having exterior tapered surfaces, an internally threaded binding nut having an interior tapered surface shaped to conform to the exterior surfaces of said segments, a tapered nipple shaped to receive a preformed flared end of a tube, one end of said segments bearing against the shoulder of the threaded boss to control and limit the forward longitudinal movement of said segments, the said binding nut when turned forward contracting, to a predetermined limit, the said segments to squeeze said segments into a gripping relation along the flared surface of the tube and along the area directly behind the flared section of the tube, a resilient means to expand the said segments to hold their outer tapered surfaces in juxtaposition with the interior tapered surface of the binding nut when said binding nut is retracted, and said segments having an extended preformed outer portion adjacent to the tube to be gripped, with means to diffuse the vibrational stresses on the coupling.

6. In a detachable tube coupling including an exteriorly screw-threaded boss having a shoulder, a collar comprised of a plurality of longitudinal segments that act independently of each other, an internally threaded binding nut having an interior tapered surface conforming to the exterior surfaces of said segments, a tapered nipple shaped to receive a preformed flared end of a tube, one end of said segments bearing against the shoulder of the threaded boss to control and limit the forward longitudinal movement of said segments, the interior surface of said segments having a roughened texture, said binding nut when turned forward contracting the said segments to a predetermined limit, to squeeze said segments into a gripping relation along the flared surface of the tube and along the area directly behind the flared section of the tube, said shoulder of the threaded boss having stop means and said segments being formed to co-operate with said stop means to limit the rotation of said segments as the said binding nut squeezes the said segments into a gripping relation on the tube.

7. In a detachable tube coupling according to claim 6 said shoulder being undercut to provide for limited forward longitudinal movement of the segments after said segments have been contracted into a gripping relation on the tube to force the flared end of said tube tightly against the tapered nipple of the coupling.

8. In a detachable tube coupling including an exteriorly screw-threaded boss with a shoulder and having an extended nipple for insertion into the end of a tube, a collar comprised of a plurality of longitudinal segments that act independently of each other, each segment being provided with complementary lip portions along the longitudinal edges so that the plurality of segments form a complete enclosure, said segments having also exterior tapered surfaces, a binding nut having an interior taper to conform to the exterior taper of the segments, the binding nut having also an internal screw thread to engage the threaded boss of the coupling, the binding nut contracting to a predetermined limit, the segments upon the tube and thus clamping the tube upon the nipple, resilient means to expand the said segments to hold their outer tapered surfaces in juxtaposition with the interior tapered surface of the binding nut when said binding nut is retracted, said shoulder of the threaded boss having stop means and said segments being formed to co-operate with said stop means to limit the rotation of said segments as the said binding nut squeezes the said segments into a gripping relation on the tube.

9. In a detachable tube coupling including an exteriorly screw-threaded boss and having an extended nipple with exterior serrations for insertion into the end of a tube, a collar comprised of a plurality of longitudinal segments that act independently of each other and with serrations along their inner face, said segments having exterior tapered surfaces, a binding nut having an interior taper to conform to the exterior taper of the segments, the binding nut having also an internal screw thread to engage the threaded boss of the coupling, the serrations of the segments and the serrations of the nipple co-acting to grip the tube, the binding nut contracting the segments upon the tube and thus clamping the tube upon the nipple, said segments being selectively preformed to the arc of a particular circle to limit their contraction, and the resultant gripping pressure, to prevent the crushing of the tube.

10. In a detachable tube coupler including, a collar comprised of a plurality of double-ended segments that act independently of each other, the interior surface of said segments having a roughened texture, a pair of tube couplings which have a screw-threaded boss and socket to form a union, the exterior ends of each segment tapered, the said tube couplings having inner tapered surfaces at their outer ends which conform to the taper of the segments, the exterior tapered surfaces of the double-ended segments co-acting with the interior tapers of the tube couplings to contract, to a predetermined limit, the said segments to grip the tubes, and a resilient means to expand the said double-ended segments to hold their outer tapered surfaces in juxtaposition with the interior tapered surfaces of said couplings.

11. In a detachable tube coupler including, a collar comprised of a plurality of double-ended segments that act independently of each other, a double-ended male insert, a pair of tube couplings which have a screw-threaded boss and socket to form a union, the central inner surface of said double-ended segments cut out to conform to the flared ends of a pair of oppositely positioned inserted flared tubes and the exterior ends of each segment tapered, a double-ended male bearing inserted between the said flared ends of the two tubes, the said tube couplings having inner tapered surfaces at their outer ends which conform to the taper of the segments, the exterior tapered surfaces of the double-ended segments co-acting with the interior tapers of the tube couplings as the coupling members are screwed together contracting the said segments to grip the tubes tightly on each of their flared ends, and along the area of the tube adjacent to their flared ends, means to limit such contraction and the resultant gripping pressure, to prevent crushing the tube, and means to diffuse the vibrational stresses on the coupling.

12. In a detachable coupling including an exteriorly screw-threaded boss and having also a bore to receive a tube, a collar comprised of a plurality of longitudinal segments having exterior tapered surfaces that act independently of each other, an interiorly screw-threaded binding nut having an extended portion with an interior taper to conform to the taper of the segments, a tube to be inserted in the bore, said tube having one or more key slots cut in its periphery, said segments having keys formed integral therewith on the inner surfaces thereof and conforming in size and shape to the key slots formed on the said tube, the binding nut when turned forward on the threaded boss contracting, to a predetermined limit, the said segments by means of the tapered co-acting surfaces to squeeze said keys into their respective key slots to hold the tube and coupling in a tightly key anchored relation.

13. In a detachable tube coupling including an exteriorly screw-threaded boss and having a bore, a collar comprised of a plurality of longitudinal segments having exterior tapered surfaces that act independently of each other, said taper being comprised of two or more steps with a sharp right angle face or shoulder between a binding nut having an interior taper with steps in opposite relation to conform to the taper of the segments, a tube to be inserted in the coupling, means to key the tube and the segments in predetermined relationship, and a means to predetermine and limit the degree of lateral clamping pressure and the degree of sealing pressure exerted in a longitudinal direction, to prevent the crushing of the tube.

14. In a detachable tube coupling including an exteriorly screw-threaded boss and having a bore, a collar comprised of a plurality of longitudinal segments having exterior tapered surfaces that act independently of each other, an interiorly screw-threaded binding nut having an extended portion with an interior taper to conform to the taper of the segments, a tube to be inserted in the coupling, means to key the tube and the segments in a predetermined relationship, and means to predetermine and limit the degree of lateral clamping pressure and the degree of sealing pressure exerted in a longitudinal direction, to prevent the crushing of the tube.

ALBERT W. MILLER.